US012617429B2

(12) United States Patent
Kato

(10) Patent No.: US 12,617,429 B2
(45) Date of Patent: May 5, 2026

(54) ROAD SURFACE CONTACT AVOIDANCE SYSTEM

(71) Applicant: SUBARU CORPORATION, Tokyo (JP)

(72) Inventor: Hideaki Kato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 49 days.

(21) Appl. No.: 18/742,774

(22) Filed: Jun. 13, 2024

(65) Prior Publication Data

US 2025/0002043 A1 Jan. 2, 2025

(30) Foreign Application Priority Data

Jun. 28, 2023 (JP) ................................. 2023-106526

(51) Int. Cl.
*B60W 60/00* (2020.01)
*B60R 21/013* (2006.01)
*G01C 21/34* (2006.01)
*H04L 67/12* (2022.01)
*H04W 4/44* (2018.01)

(52) U.S. Cl.
CPC ....... *B60W 60/0011* (2020.02); *B60R 21/013* (2013.01); *G01C 21/3407* (2013.01); *H04L 67/12* (2013.01); *H04W 4/44* (2018.02); *B60R 2021/01308* (2013.01); *B60W 2556/50* (2020.02)

(58) Field of Classification Search
CPC ......... B60W 60/0011; B60W 2556/50; B60W 2050/143; B60W 2530/00; B60W 2530/201; B60W 2552/00; B60W 2552/35; B60W 2556/05; B60W 2556/45; B60W 50/14; B60R 21/013; B60R 2021/01308; G01C 21/3407; H04L 67/12; H04W 4/44
See application file for complete search history.

(56) References Cited

U.S. PATENT DOCUMENTS

2014/0195112 A1* 7/2014 Lu ........................ B60G 17/015
                                                    703/2
2018/0079272 A1* 3/2018 Aikin ................. B60G 17/0165
(Continued)

FOREIGN PATENT DOCUMENTS

JP        2007-213143 A       8/2007

*Primary Examiner* — Stephanie T Su
(74) *Attorney, Agent, or Firm* — Rimon P.C.

(57) ABSTRACT

A road surface contact avoidance system includes a server apparatus and vehicles communicably coupled to the server apparatus via a network. The vehicles each include a road surface contact detector detecting contact between a bottom portion of a corresponding one of the vehicles and a road surface, a contact information transmitter transmitting contact information to the server apparatus, a contact determiner determining whether a possibility of the contact between the bottom portion of the corresponding vehicle and the road surface is high based on vehicle information on the corresponding vehicle and vehicle information on another of the vehicles on which the contact has been detected, and a control processor performing control to avoid an occurrence of the contact between the bottom portion of the corresponding vehicle and the road surface when the contact determiner determines that the possibility of the contact is high.

15 Claims, 11 Drawing Sheets

| CONTACT INFORMATION | | | | | | | | |
|---|---|---|---|---|---|---|---|---|
| POSITION INFORMATION ON CONTACT LOCATION | VEHICLE INFORMATION | | | | | | | |
| | LOWEST GROUND LEVEL | OVERALL LENGTH | VEHICLE NAME (TYPE NAME) | VEHICLE WIDTH | TREAD | WHEEL BASE | FRONT OVER-HANG | REAR OVER-HANG |
| LATITUDE xxx° xx' xx" LONGITUDE xxx° xx' xx" HEIGHT ●m | 135 | 4475 | ABCD | 1780 | 1540 | 2670 | 975 | 830 |

(56)           References Cited

U.S. PATENT DOCUMENTS

| | | | |
|---|---|---|---|
| 2021/0097707 A1* | 4/2021 | Oba | G08G 1/167 |
| 2022/0016950 A1* | 1/2022 | Ericksen | B62K 25/04 |
| 2024/0416949 A1* | 12/2024 | Barrera | B60W 30/16 |

* cited by examiner

| POSITION INFORMATION ON CONTACT LOCATION | CONTACT INFORMATION | | | | | | | |
| | VEHICLE INFORMATION | | | | | | | |
| | LOWEST GROUND LEVEL | OVERALL LENGTH | VEHICLE NAME (TYPE NAME) | VEHICLE WIDTH | TREAD | WHEEL BASE | FRONT OVER-HANG | REAR OVER-HANG |
| LATITUDE xx°xx'xx" LONGITUDE °'**" HEIGHT ●m | 135 | 4475 | ABCD | 1780 | 1540 | 2870 | 975 | 830 |

FIG. 3

ROAD SURFACE CONTACT AVOIDANCE SYSTEM

CROSS-REFERENCE TO RELATED APPLICATIONS

The present application claims priority from Japanese Patent Application No. 2023-106526 filed on Jun. 28, 2023, the entire contents of which are hereby incorporated by reference.

BACKGROUND

The disclosure relates to a road surface contact avoidance system.

An electric vehicle or a plug-in hybrid vehicle provided with an accumulator battery that is chargeable by an external power source has recently become popular from the viewpoint of environmental protection.

In general, an accumulator battery mounted on a vehicle has low resistance to impact or external stress. For example, a large impact applied to the accumulator battery can cause short circuiting or the like inside the accumulator battery, which can result in the generation of smoke, fire, or the like in some cases.

It is therefore necessary for an electric vehicle or a plug-in hybrid vehicle to avoid the occurrence of contact between a road surface and a bottom portion of the vehicle on which the accumulator battery is installed.

As an example of a technique to avoid the occurrence of the contact, Japanese Unexamined Patent Application Publication (JP-A) No. 2007-213143 discloses a technique to determine whether the bottom portion of the vehicle will come into contact with the road surface by analyzing data on the shape of the road surface acquired from an image of the road surface captured by another vehicle.

SUMMARY

An aspect of the disclosure provides a road surface contact avoidance system including a server apparatus and vehicles. The vehicles are communicably coupled to the server apparatus via a network. The vehicles each include a position information obtainer, a road surface contact detector, a contact information generator, a contact information transmitter, a contact determiner, and a control processor. The position information obtainer is configured to acquire position information on a corresponding one of the vehicles. The road surface contact detector is configured to detect contact between a bottom portion of the corresponding vehicle and a road surface. The contact information generator is configured to generate contact information in which position information on a location of the contact is associated with vehicle information on the corresponding vehicle. The contact information transmitter is configured to transmit the contact information to the server apparatus. The contact determiner is configured to determine whether a possibility of the contact between the bottom portion of the corresponding vehicle and the road surface is high based on the vehicle information on the corresponding vehicle and vehicle information on another of the vehicles on which the contact has been detected. The vehicle information on the other vehicle is included in the contact information received from the server apparatus. The control processor is configured to perform control adapted to avoid an occurrence of the contact between the bottom portion of the corresponding vehicle and the road surface when the contact determiner determines that the possibility of the contact is high. The server apparatus includes a storage and an information transmitter. The storage is configured to store the contact information received from the contact information transmitter of each of the vehicles. The information transmitter is configured to transmit the contact information stored in the storage to the vehicles.

An aspect of the disclosure provides a road surface contact avoidance system including a server apparatus and vehicles. The vehicles are communicably coupled to the server apparatus via a network. The vehicles each include one or more processors and one or more memories communicably coupled to the one or more processors. The one or more processors are configured to acquire position information on a corresponding one of the vehicles, detect contact between a bottom portion of the corresponding vehicle and a road surface, generate contact information in which position information on a location of the contact is associated with vehicle information on the corresponding vehicle, transmit the contact information to the server apparatus, determine whether a possibility of the contact between the bottom portion of the corresponding vehicle and the road surface is high based on the vehicle information on the corresponding vehicle and vehicle information on another of the vehicles on which the contact has been detected, the vehicle information on the other vehicle being included in the contact information received from the server apparatus, and perform control adapted to avoid an occurrence of the contact between the bottom portion of the corresponding vehicle and the road surface when the possibility of the contact is determined to be high. The server apparatus includes a storage and a processor. The storage is configured to store the contact information received from the one or more processors of each of the vehicles. The processor is configured to transmit the contact information stored in the storage to the vehicles.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

FIG. 3 is a table illustrating contact information generated by a contact information generator of the vehicle according to one example embodiment of the disclosure.

3

Figure 9:
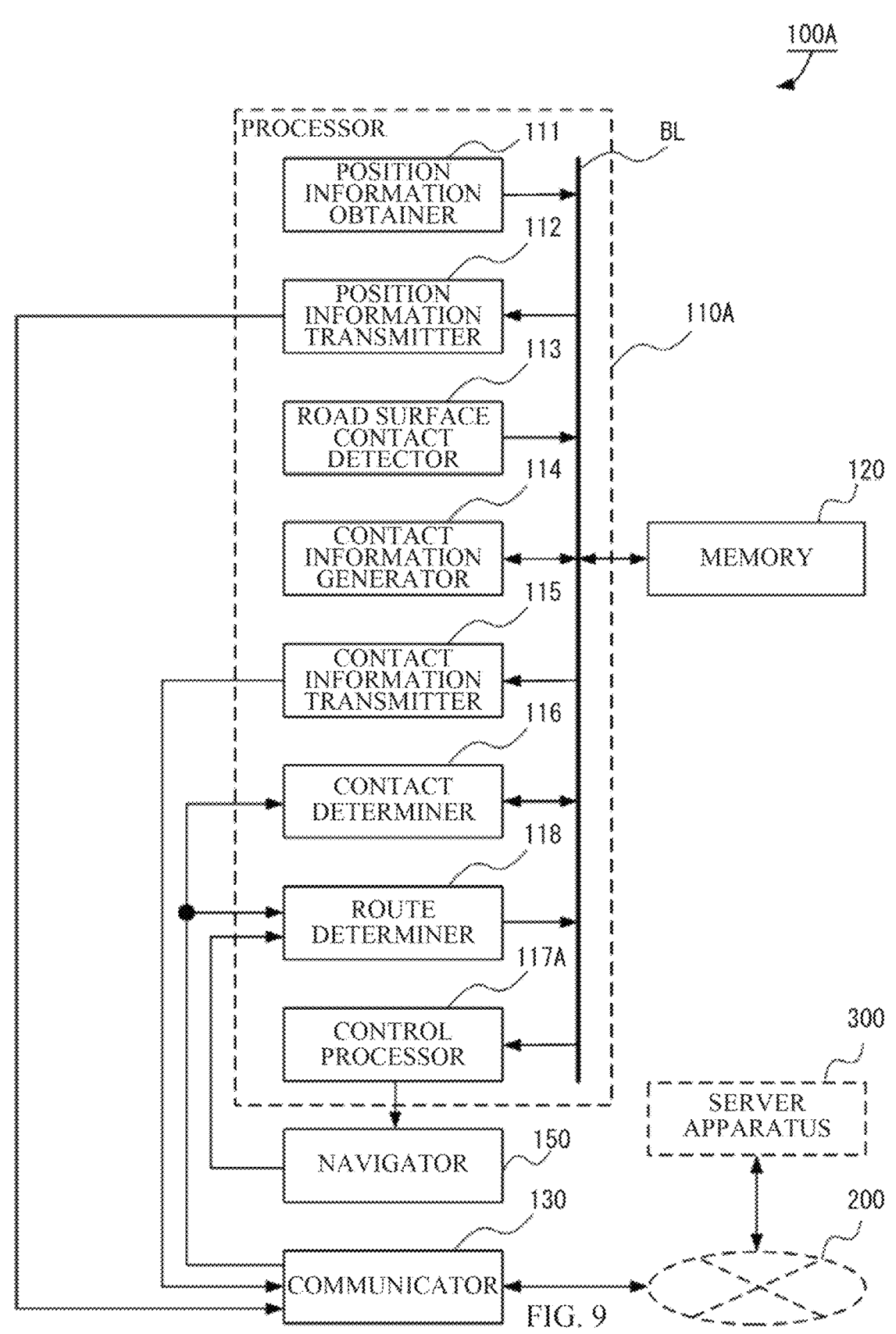

FIG. 9 is a block diagram illustrating an exemplary configuration of the vehicle according to one example embodiment of the disclosure.

Figure 10:
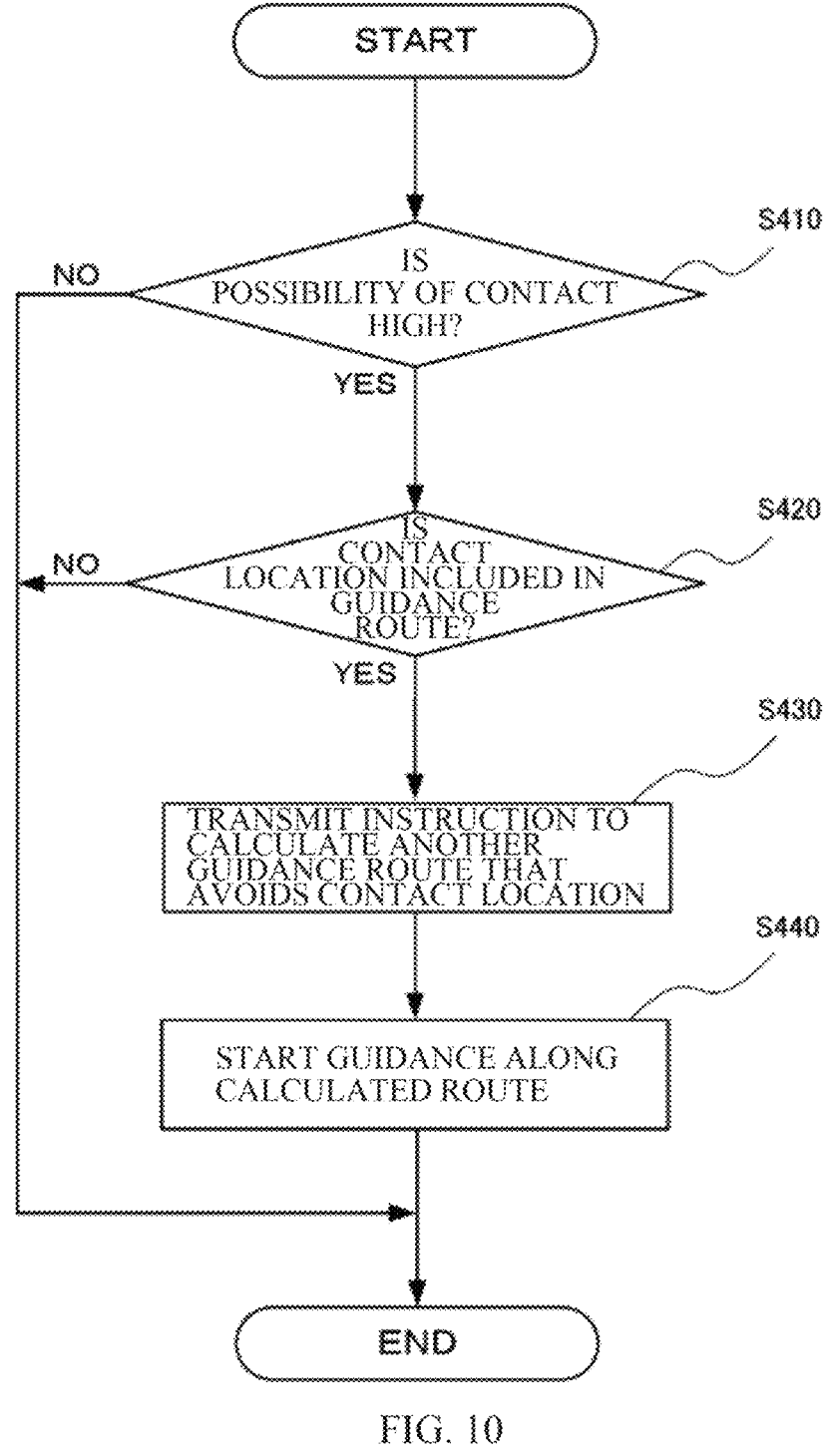

FIG. 10 is a flowchart of a process performed by the vehicle according to one example embodiment of the disclosure.

Figure 11:
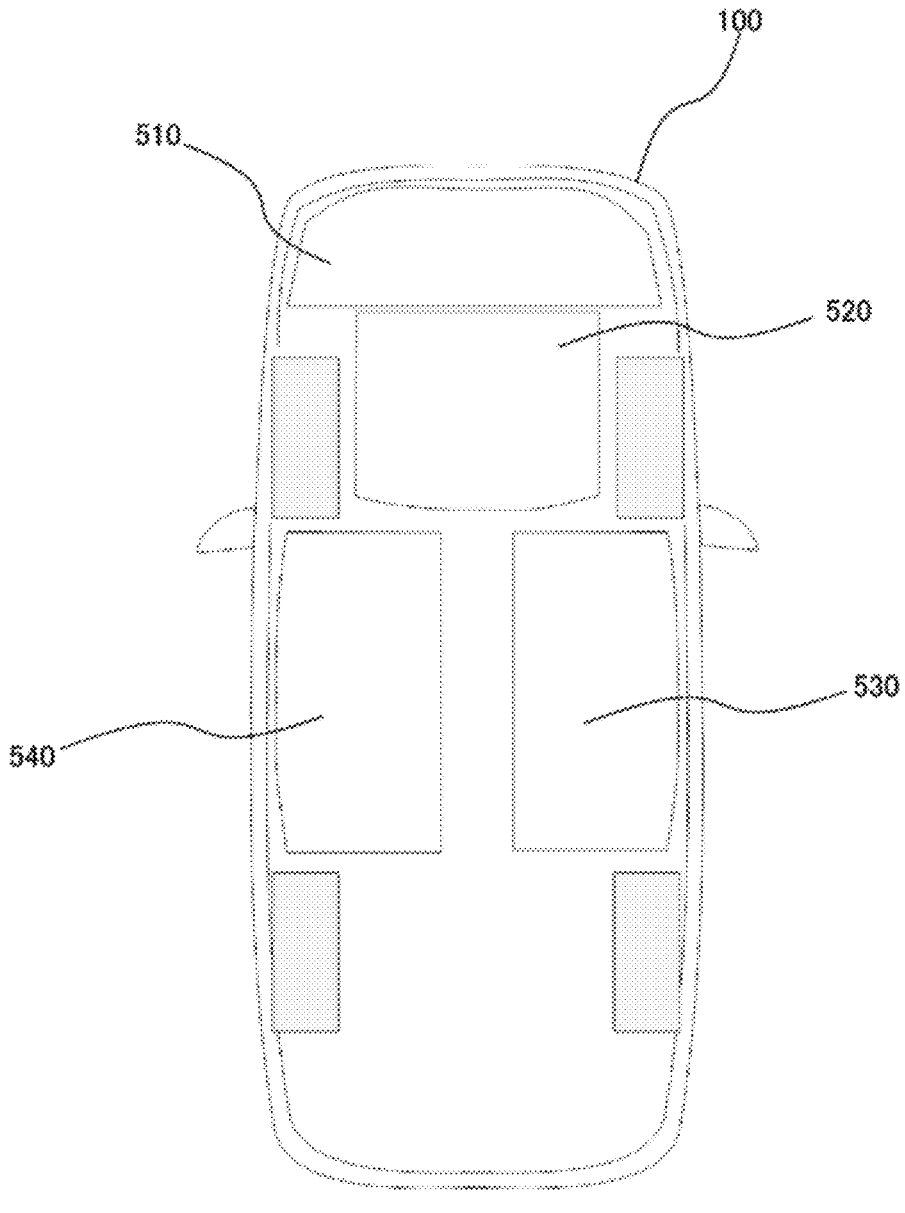

FIG. 11 is a diagram illustrating undercovers installed on a bottom surface of the vehicle including the road surface contact avoidance system according to one example embodiment of the disclosure.

DETAILED DESCRIPTION

When the data on the shape of a road surface changes due to limited-time road construction or the like and contact between a bottom portion of a vehicle and the road surface actually occurs, for example, it is difficult for the technique described in JP-A No. 2007-213143 to share contact information, such as information on the vehicle making the contact and information on a location of the contact, between vehicles. This can result in the occurrence of contact between a bottom portion of an own vehicle and the road surface.

It is desirable to provide a road surface contact avoidance system that avoids the occurrence of contact between a vehicle and a road surface by sharing the contact information between vehicles.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings. As used herein, the term "collision" may be used interchangeably with the term "contact".

A road surface contact avoidance system according to some example embodiments will now be described with reference to FIGS. 1 to 10.

FIRST EXAMPLE EMBODIMENT

A road surface contact avoidance system 1 according to a first example embodiment is described with reference to FIGS. 1 to 7.

Configuration of Road Surface Contact Avoidance System 1

Figure 1:
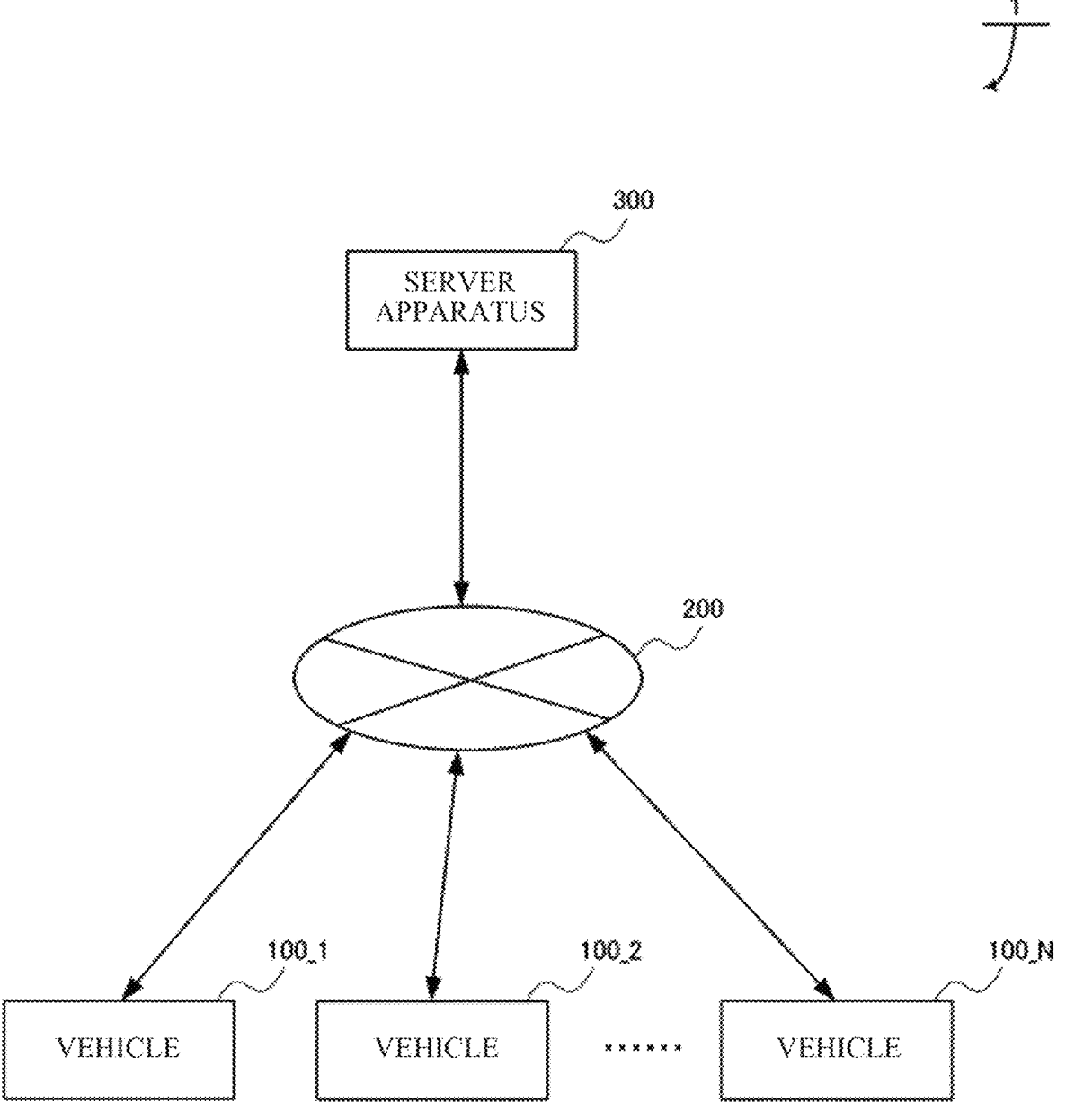
FIG. 1 is a diagram illustrating an exemplary configuration of a road surface contact avoidance system according to one example embodiment of the disclosure.

As illustrated in FIG. 1, the road surface contact avoidance system 1 according to a first example embodiment includes vehicles 100_1 to 100_N, a network 200, and a server apparatus 300. The vehicles 100_1 to 100_N may include a first vehicle (e.g., the vehicle 100_1) and a second vehicle (e.g., one or more of the vehicles 100_2 to 100_N).

In the following description, the vehicles 100_1 to 100_N may also be each referred to as a "vehicle 100" or collectively referred to as "vehicles 100".

The vehicles 100 are communicably coupled to the server apparatus 300 via the network 200.

The network 200 may be, for example, an internet network.

Exemplary configurations of the vehicles 100 and the server apparatus 300 will be described later.

Configuration of Vehicles 100

Figure 2:
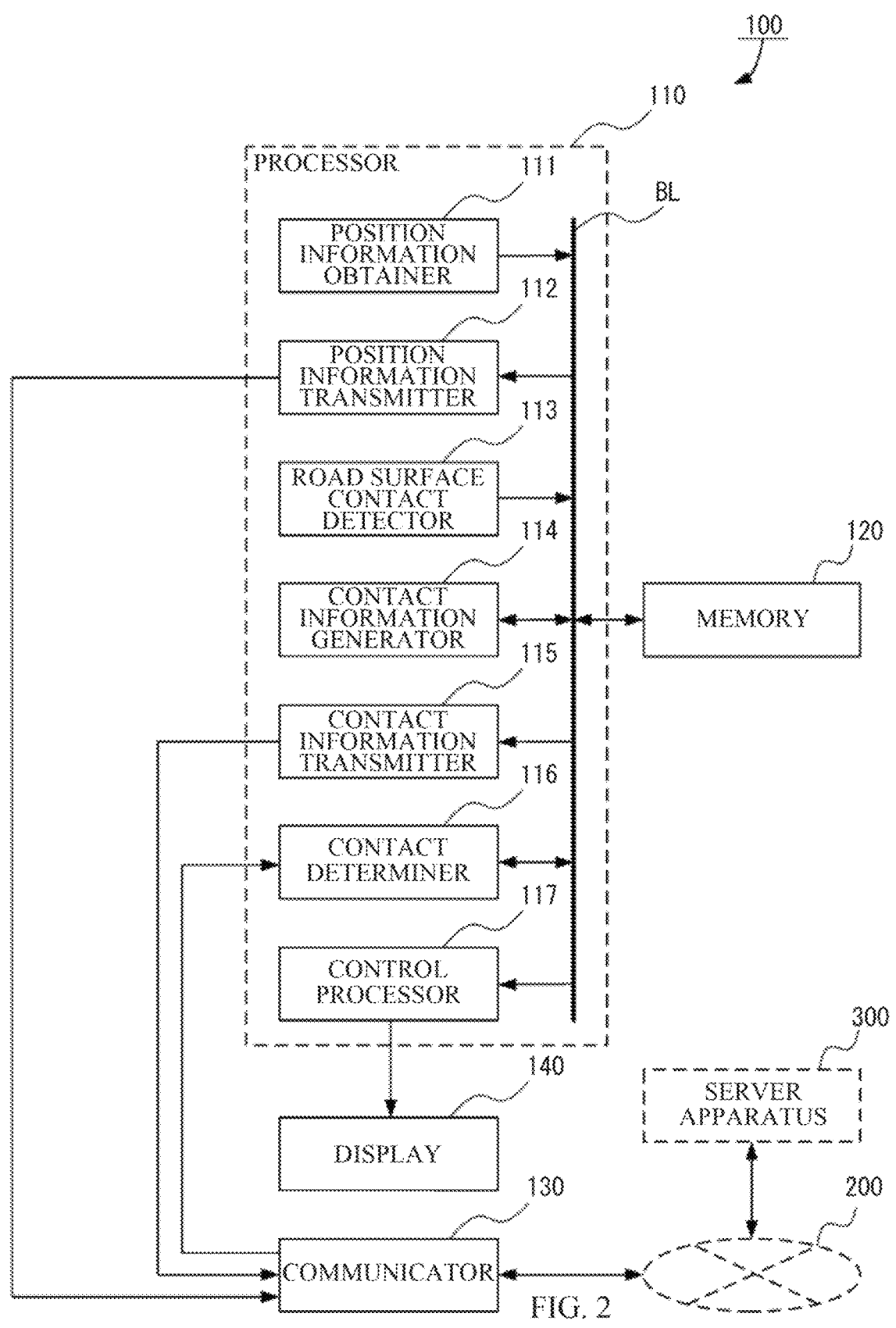
FIG. 2 is a block diagram illustrating an exemplary configuration of a vehicle according to one example embodiment of the disclosure.

As illustrated in FIG. 2, each of the vehicles 100 may include a processor 110, a memory 120, a communicator 130, and a display 140.

An exemplary configuration of the processor 110 will be described later.

The memory 120 may include a read only memory (ROM), a random access memory (RAM), or the like, which is not illustrated.

The memory 120 may store a control program, map information, various kinds of data received from the processor 110, and the like.

In the first example embodiment, the memory 120 may store vehicle information in advance. The vehicle information may include at least the lowest ground level of the vehicle 100 and the overall length of the vehicle 100.

The communicator 130 may be, for example, a wireless communication module, and may communicate with the server apparatus 300 via the network 200.

The display 140 may be, for example, a display panel such as a liquid crystal display or an organic EL panel. The display 140 may display information received from the processor 110.

Configuration of Processor 110

As illustrated in FIG. 2, the processor 110 includes a position information obtainer 111, a position information transmitter 112, a road surface contact detector 113, a contact information generator 114, a contact information transmitter 115, a contact determiner 116, and a control processor 117.

Various kinds of data may be transmitted between these components of the processor 110 and the memory 120 via a bus line BL.

The position information obtainer 111 acquires position information on the vehicle 100.

The position information obtainer 111 may acquire a latitude, a longitude, and the like of a current position of the vehicle 100 based on wireless electric waves received from global positioning system (GPS) satellites.

The position information obtainer 111 may store the acquired position information on the vehicle 100 in the memory 120 via the bus line BL.

The position information transmitter 112 may transmit the position information on the vehicle 100 to the server apparatus 300.

For example, the position information transmitter 112 may transmit the position information on the vehicle 100 acquired from the memory 120 to the server apparatus 300 via the communicator 130 and the network 200.

The road surface contact detector 113 detects contact between a bottom portion of the vehicle 100 and a road surface.

For example, the road surface contact detector 113 may detect the contact between the bottom portion of the vehicle 100 and the road surface based on a sensor output from an impact sensor disposed on an undercover or the like of the bottom portion of the vehicle 100.

For instance, the road surface contact detector 113 may detect the contact between the bottom portion of the vehicle 100 and the road surface when the sensor output from the impact sensor is larger than a predetermined threshold value.

When detecting the contact between the bottom portion of the vehicle 100 and the road surface, the road surface contact detector 113 may transmit information on the detection of the contact to the contact information generator 114 and the control processor 117 to be described later via the bus line BL.

Note that the method of detecting the contact is not limited to the detection method described above, and another method may be used as long as the road surface contact detector 113 makes it possible to detect the contact between the bottom portion of the vehicle 100 and the road surface.

The contact information generator 114 generates contact information in which position information on a location of the detected contact is associated with the vehicle information on the vehicle 100.

Here, the vehicle information may include at least the lowest ground level of the vehicle 100 and the overall length of the vehicle 100.

When receiving the information on the detection of the contact from the road surface contact detector 113, the contact information generator 114 may acquire the position information on the vehicle 100 from the memory 120 via the bus line BL.

The contact information generator 114 may determine the position information on the vehicle 100 acquired from the memory 120 as position information on the location of the contact.

As illustrated in FIG. 3, the contact information generator 114 may generate the contact information in which the vehicle information on the vehicle 100 acquired from the memory 120 is associated with the position information on the location of the contact.

Note that the vehicle information may further include data on a vehicle type name (model name), a vehicle width, a wheel base, a tread, a front overhang, and a rear overhang of the vehicle 100, for example.

The contact information generator 114 may transmit the generated contact information to the contact information transmitter 115 to be described later via the bus line BL.

The contact information transmitter 115 transmits the contact information received from the contact information generator 114 to the server apparatus 300.

For example, the contact information transmitter 115 may transmit the contact information received from the contact information generator 114 to the server apparatus 300 via the communicator 130 and the network 200.

The contact determiner 116 determines whether the possibility of the contact between the bottom portion of the vehicle 100 and the road surface is high based on the vehicle information on the corresponding vehicle 100 (the first vehicle) and the vehicle information on another vehicle 100 (the second vehicle) on which the contact has been detected. The vehicle information on the other vehicle 100 may be included in the contact information received from the server apparatus 300.

For example, when receiving the contact information from the server apparatus 300 via the network 200 and the communicator 130, the contact determiner 116 may determine whether the possibility of contact between the bottom portion of the corresponding vehicle 100 and the road surface is high based on the vehicle information on the corresponding vehicle 100 acquired from the memory 120 and the vehicle information on the other vehicle 100 on which contact with the road surface has been detected.

For example, when the lowest ground level of the corresponding vehicle 100 is lower than the lowest ground level of the other vehicle 100 on which the contact with the road surface has been detected, the contact determiner 116 may determine that the possibility of the contact between the bottom of the corresponding vehicle 100 and the road surface is high.

For example, when the overall length of the corresponding vehicle 100 is longer than the overall length of the other vehicle 100 on which the contact with the road surface has been detected, the contact determiner 116 may determine that the possibility of the contact between the bottom portion of the corresponding vehicle 100 and the road surface is high.

When the possibility of contact between the bottom portion of the corresponding vehicle 100 and the road surface is determined to be high in one or both of the result of determination based on the lowest ground level and the result of determination based on the overall length, the contact determiner 116 may transmit the result of determination indicating that the possibility of contact is high and the contact information received from the server apparatus 300 to the control processor 117 to be described later.

When receiving the result of determination indicating that the possibility of contact is high from the contact determiner 116, the control processor 117 performs control adapted to avoid the occurrence of contact between the bottom portion of the corresponding vehicle 100 and the road surface.

For example, when receiving the result of determination indicating that the possibility of contact is high from the contact determiner 116, the control processor 117 may notify an occupant of the corresponding vehicle 100 of information urging the occupant to drive the vehicle 100 so as to avoid the location of the contact.

For instance, the control processor 117 may cause the display 140 to display textual information indicating "A possible location of contact between the vehicle and the road surface is detected at a location 500 meters straight ahead. Drive the vehicle avoiding that point.", and map information on the location of the contact.

Configuration of Server Apparatus 300

Now, an exemplary configuration example of the server apparatus 300 is described with reference to FIG. 4.

Figure 4:
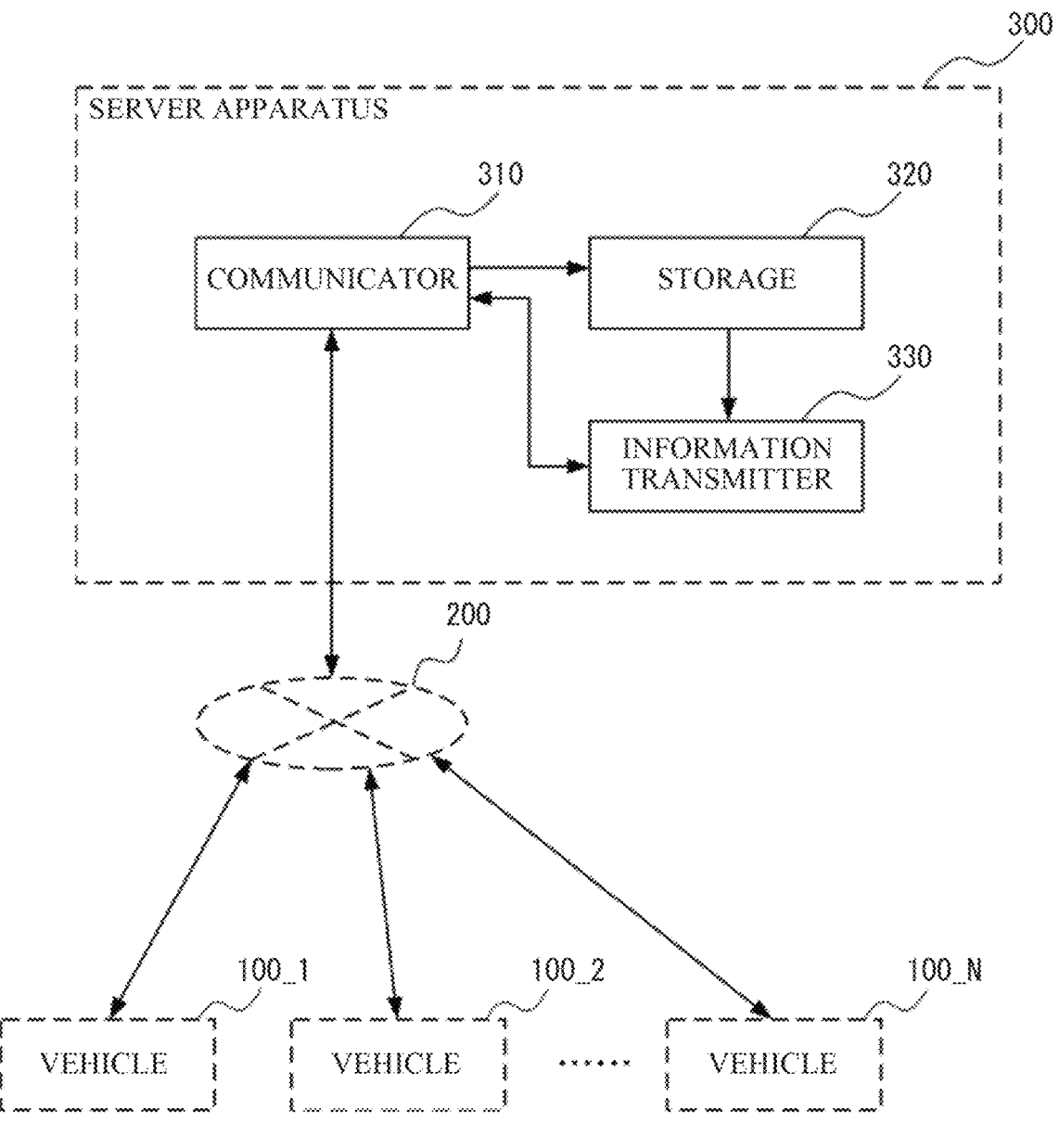
FIG. 4 is a diagram illustrating an exemplary configuration of a server apparatus according to one example embodiment of the disclosure.

As illustrated in FIG. 4, the server apparatus 300 may include a communicator 310, a storage 320, and an information transmitter 330.

The communicator 310 may communicate with the vehicles 100 via the network 200.

In the first example embodiment, the communicator 310 may transmit the contact information received from the vehicles 100 to the storage 320 to be described later.

The communicator 310 may transmit the position information received from the vehicles 100 to the information transmitter 330 to be described later.

The communicator 310 may transmit the contact information received from the information transmitter 330, which will be described later, to the vehicles 100 via the network 200.

The storage 320 stores the contact information received from the communicator 310.

The information transmitter 330 transmits the contact information stored in the storage 320 to the vehicles 100.

In the first example embodiment, the information transmitter 330 may send the first vehicle via the communicator 310 the contact information on the second vehicle (e.g., one or more of the vehicles 100_2 to 100_N) detected within a predetermined range from the position information received from the position information transmitter 112 of the first vehicle (e.g., the vehicle 100_1) out of the contact information stored in the storage 320.

For example, the information transmitter 330 may transmit, to the first vehicle via the communicator 310, the contact information on the second vehicle detected within one kilometer from the position information received from the position information transmitter 112 of the first vehicle.

Process Adapted to Transmit Position Information and Contact Information

Now, a process adapted to transmit the position information and the contact information on the vehicle 100 is described with reference to FIG. 5.

Figure 5:
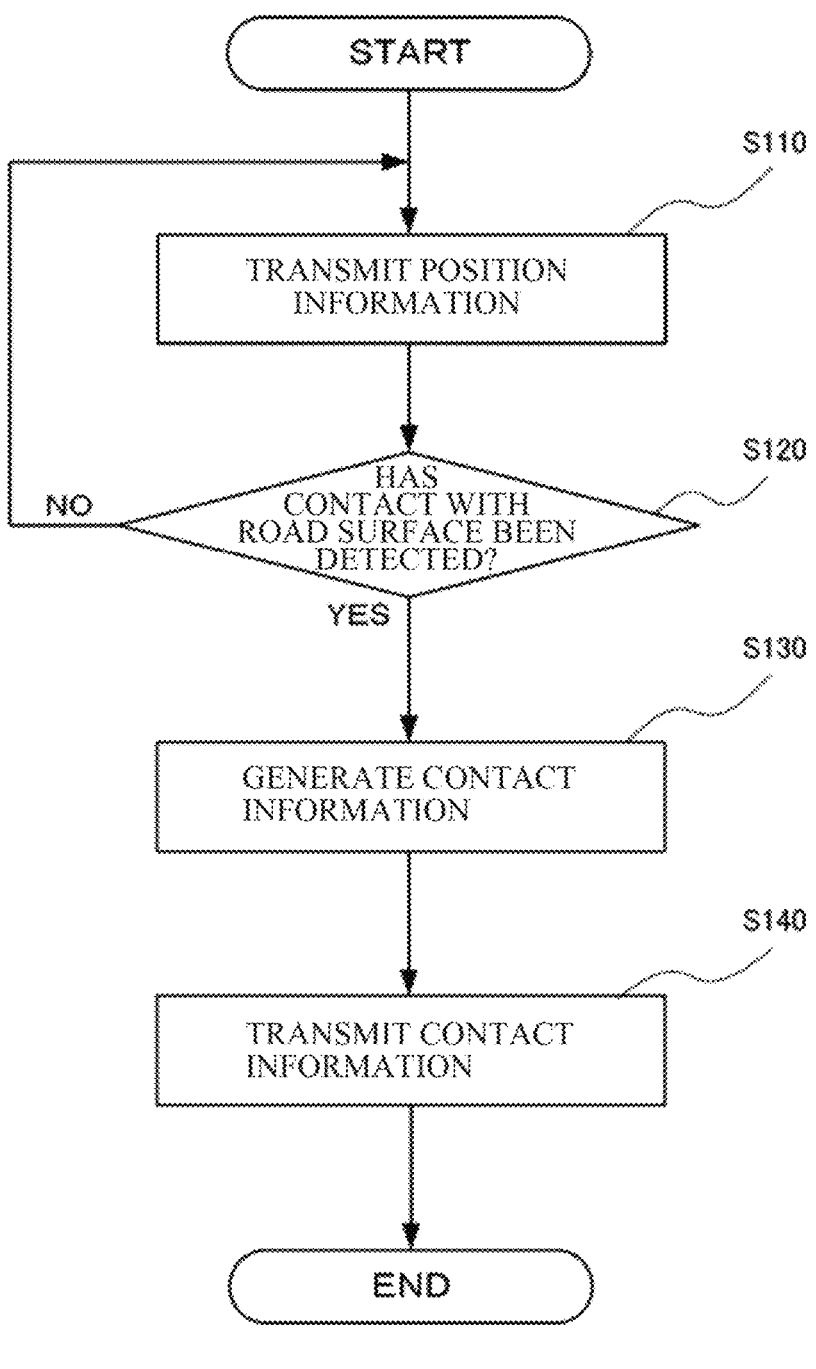
FIG. 5 is a flowchart of a process performed by the vehicle according to one example embodiment of the disclosure.

As illustrated in FIG. 5, the position information transmitter 112 may transmit the position information on the corresponding vehicle 100 (the first vehicle) to the server apparatus 300 (Step S110).

The control processor 117 may determine whether the road surface contact detector 113 has detected contact between the bottom portion of the corresponding vehicle 100 and the road surface (Step S120).

When the control processor 117 determines that the information on the detection of the contact has not been received from the road surface contact detector 113 (Step S120: NO), the process may return to Step S110 and continue.

In contrast, when the control processor 117 determines that the information on the detection of the contact has been received from the road surface contact detector 113 (Step S120: YES), the process may proceed to Step S130.

The contact information generator 114 may generate the contact information (Step S130).

The contact information transmitter 115 may transmit the contact information generated in Step S130 to the server apparatus 300 (Step S140), following which the process may be terminated.

Process in Server Apparatus 300

Now, an exemplary process in the server apparatus 300 is described with reference to FIG. 6.

Figure 6:
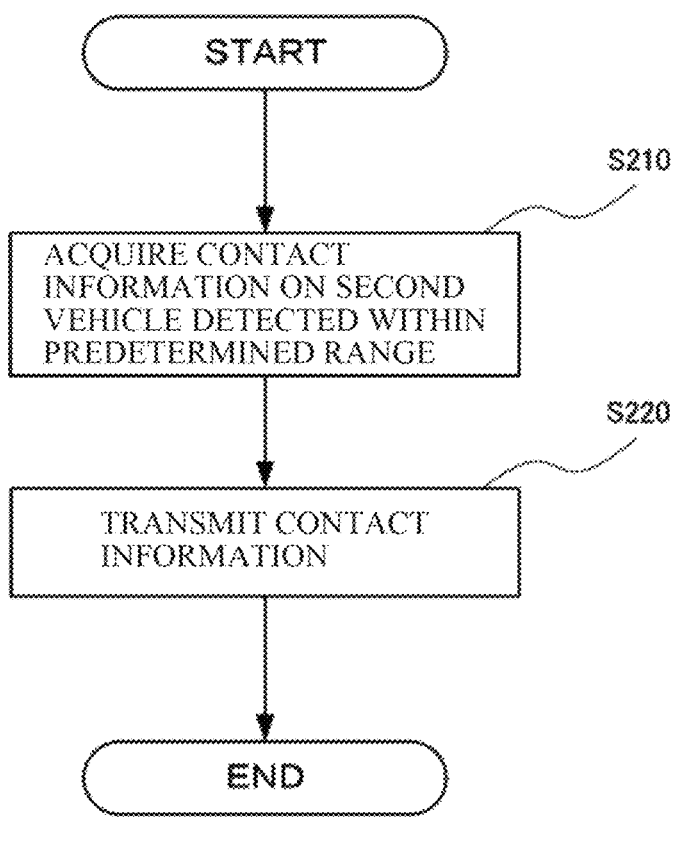
FIG. 6 is a flowchart of a process performed by the server apparatus according to one example embodiment of the disclosure.

As illustrated in FIG. 6, the information transmitter 330 may acquire, from the storage 320, the contact information on the second vehicle (e.g., one or more of the vehicles 100_2 to 100_N) detected within the predetermined range from the position information received from the position information transmitter 112 of the first vehicle (e.g., the vehicle 100_1) (Step S210).

The information transmitter 330 may transmit the contact information acquired in Step S210 to the first vehicle via the communicator 310 (Step S220), following which the process may be terminated.

Process in Vehicle 100 Upon Reception of Contact Information

Now, an exemplary process in the vehicle 100 upon the reception of the contact information from the server apparatus 300 is described with reference to FIG. 7.

Figure 7:
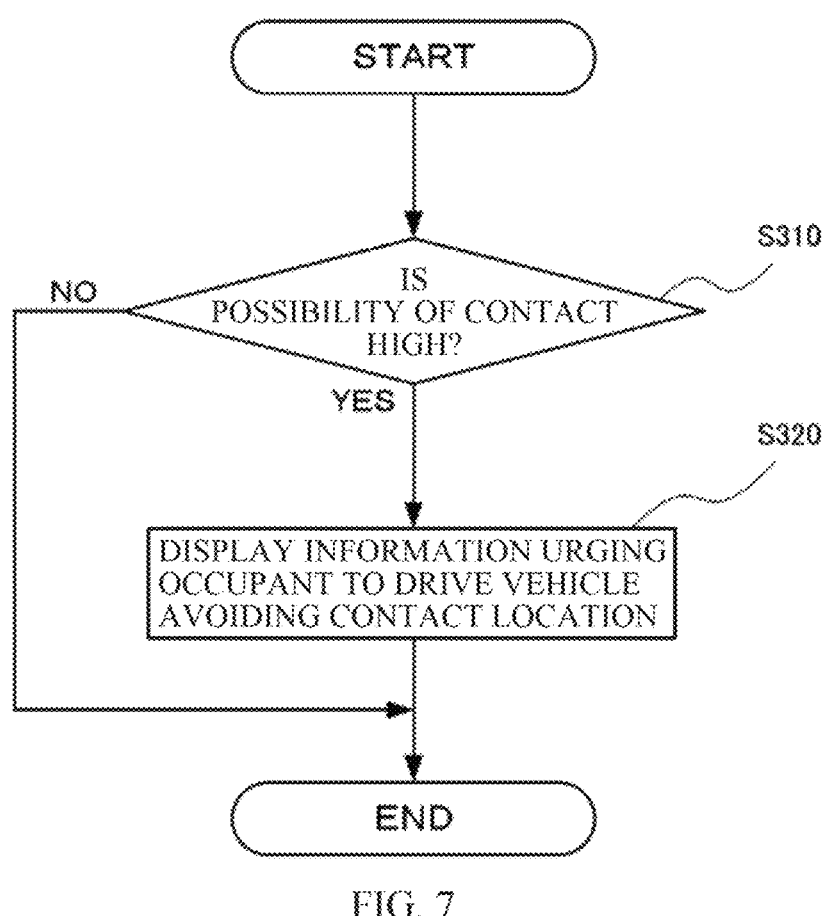
FIG. 7 is a flowchart of a process performed by the vehicle according to one example embodiment of the disclosure.

As illustrated in FIG. 7, the contact determiner 116 may determine whether the possibility of contact between the bottom portion of the corresponding vehicle 100 and the road surface is high based on the vehicle information included in the contact information received from the server apparatus 300 and the vehicle information on the corresponding vehicle 100 stored in the memory 120 (Step S310).

When the contact determiner 116 determines that the possibility of contact between the bottom portion of the corresponding vehicle 100 and the road surface is not high (Step S310: NO), the process may be terminated.

In contrast, when the contact determiner 116 determines that the possibility of contact between the bottom portion of the corresponding vehicle 100 and the road surface is high (Step S310: YES), the process may proceed to Step S320.

The control processor 117 may cause the display 140 to display the information urging the occupant to drive the corresponding vehicle 100 so as to avoid the location of the contact (Step S320), following which the process may be terminated.

Workings and Effects

As described above, the road surface contact avoidance system 1 according to the first example embodiment includes the server apparatus 300 and the vehicles 100 communicably coupled to the server apparatus 300 via the network 200.

Each of the vehicles 100 includes the position information obtainer 111, the road surface contact detector 113, the contact information generator 114, the contact information transmitter 115, the contact determiner 116, and the control processor 117. The position information obtainer 111 acquires the position information on the corresponding vehicle 100. The road surface contact detector 113 detects contact between the bottom portion of the corresponding vehicle 100 and the road surface. The contact information generator 114 generates the contact information in which the position information on the location of the contact is associated with the vehicle information on the corresponding vehicle 100. The contact information transmitter 115 transmits the contact information to the server apparatus 300. The contact determiner 116 determines whether the possibility of the contact between the bottom portion of the corresponding vehicle 100 and the road surface is high based on the vehicle information on the corresponding vehicle 100 (the first vehicle) and the vehicle information on the other vehicle 100 (the second vehicle) on which the contact has been detected. The control processor 117 performs the control adapted to avoid the occurrence of the contact between the bottom portion of the corresponding vehicle and the road surface.

The server apparatus 300 includes the storage 320 that stores the contact information received from the contact information transmitter 115 of each of the vehicles 100_1 to 100_N, and the information transmitter 330 that transmits the contact information stored in the storage 320 to the vehicle 100 (the first vehicle).

In other words, the server apparatus 300 transmits the contact information transmitted from the vehicle 100 (the second vehicle) that has actually made contact with the road surface to the other vehicle 100 (the first vehicle) coupled to the network 200.

This enables the latest contact information to be shared between the vehicles at all times.

When the contact determiner 116 determines that the possibility of the contact between the bottom portion of the corresponding vehicle 100 and the road surface is high, the control processor 117 may notify the occupant of the corresponding vehicle 100 of the information urging the occupant to drive the corresponding vehicle 100 so as to avoid the location of the contact.

Accordingly, when the possibility of contact between the bottom portion of the corresponding vehicle 100 and the road surface is determined to be high, it is possible to issue the notification of the possible contact to the occupant. It is therefore possible to avoid the occurrence of contact between the bottom portion of the corresponding vehicle 100 and the road surface.

The vehicle information described above includes at least the lowest ground level of the vehicle 100 and the overall length of the vehicle 100.

It is therefore possible to accurately determine the possibility of contact between the bottom portion of the vehicle 100 and the road surface.

The vehicles 100 of the road surface contact avoidance system 1 according to the example embodiment described above each include the position information transmitter 112 that transmits the position information on the corresponding vehicle 100 to the server apparatus 300.

The information transmitter 330 sends the first vehicle the contact information on the second vehicle (e.g., one or more of the vehicles 100_2 to 100_N) detected within the predetermined range from the position information received from the position information transmitter 112 of the first vehicle (e.g., the vehicle 100_1) out of the contact information stored in the storage 320.

That is, the information transmitter 330 may transmit the contact information to the vehicle 100 (the first vehicle) approaching the location of the contact of the second vehicle.

Accordingly, the vehicle 100 (the first vehicle) makes it possible to determine the possibility of contact between the bottom portion of the vehicle 100 and the road surface before passing through the location of the contact, and thus makes it possible to avoid the occurrence of contact between the bottom portion of the vehicle 100 and the road surface.

SECOND EXAMPLE EMBODIMENT

A road surface contact avoidance system 1A according to a second example embodiment is described with reference to FIGS. 8 to 10.

Note that elements denoted with the same reference numerals as those in the first example embodiment have the same functions as those in the first example embodiment, and detailed description thereof is thus omitted herein.

Configuration of Road Surface Contact Avoidance System 1A

Figure 8:
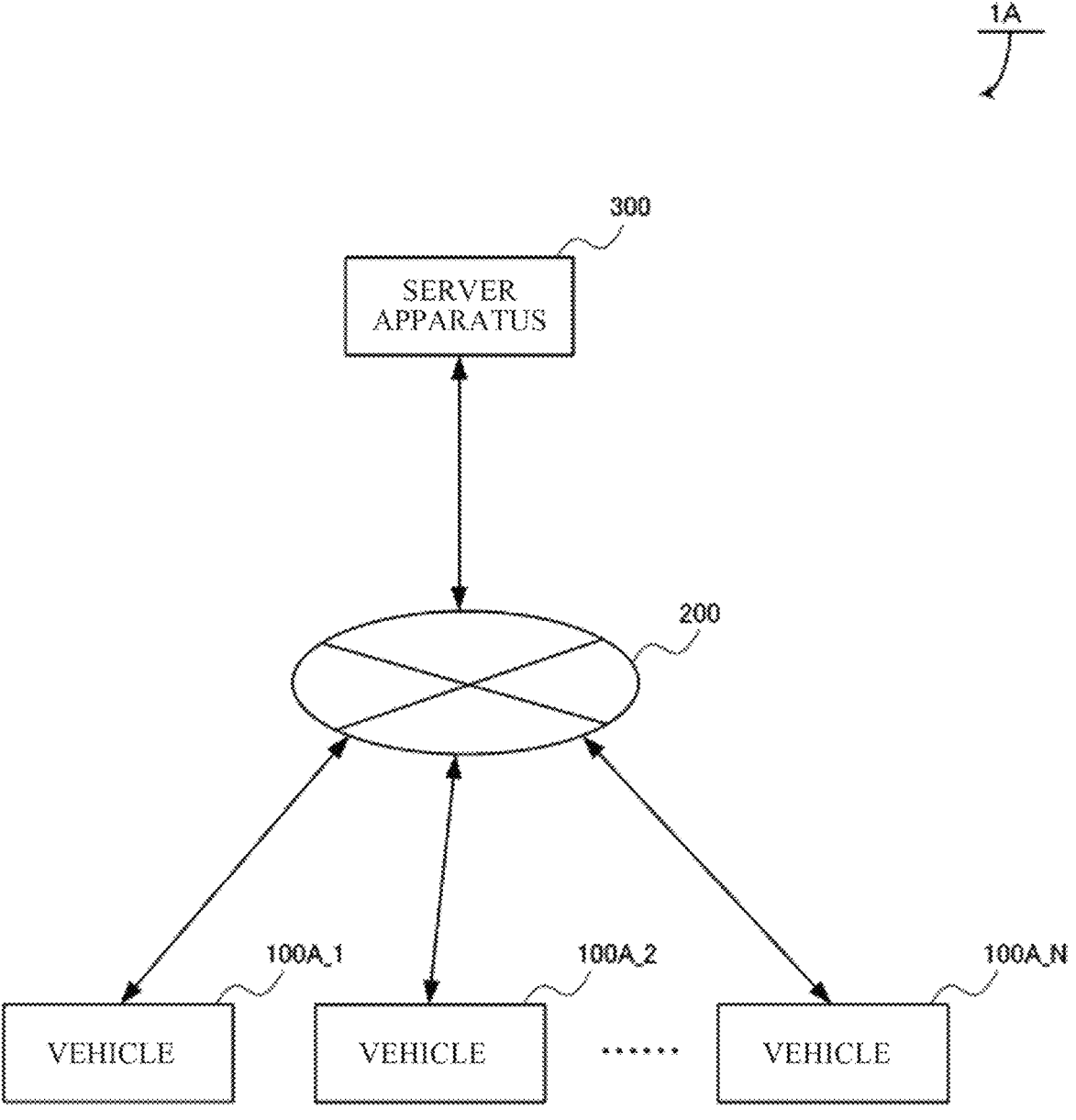
FIG. 8 is a diagram illustrating an exemplary configuration of the road surface contact avoidance system according to one example embodiment of the disclosure.

As illustrated in FIG. 8, the road surface contact avoidance system 1A according to the second example embodiment includes vehicles 100A_1 to 100A_N, the network 200, and the server apparatus 300. The vehicles 100A_1 to 100A_N may include the first vehicle (e.g., the vehicle 100A_1) and the second vehicle (e.g., one or more of the vehicles 100A_2 to 100A_N).

In the following description, the vehicles 100A_1 to 100A_N may also be each referred to as a "vehicle 100A" or collectively referred to as "vehicles 100A".

The vehicles 100A are communicably coupled to the server apparatus 300 via the network 200.

Configuration of Vehicles 100A

As illustrated in FIG. 9, each of the vehicles 100A may include a processor 110A, the memory 120, the communicator 130, and a navigator 150.

The navigator 150 will be described later.

Configuration of Processor 110A

As illustrated in FIG. 9, the processor 110A may include the position information obtainer 111, the position information transmitter 112, the road surface contact detector 113, the contact information generator 114, the contact information transmitter 115, the contact determiner 116, a control processor 117A, and a route determiner 118.

Various kinds of data may be transmitted between these components of the processor 110A and the memory 120 via the bus line BL.

The route determiner 118 may determine whether the location of the contact is on a guidance route calculated by the navigator 150 to be described later.

The route determiner 118 may acquire information on the guidance route from the navigator 150.

The route determiner 118 may make the determination based on the information on the guidance route acquired from the navigator 150 and the position information on the location of the contact included in the contact information received from the server apparatus 300.

The route determiner 118 may transmit the result of the determination to the control processor 117A to be described later via the bus line BL.

When the contact determiner 116 determines that the possibility of contact is high and the route determiner 118 determines that the location of the contact is on the guidance route calculated by the navigator 150, the control processor 117A may send the navigator 150 an instruction to calculate another guidance route to the destination that avoids the location of the contact.

For example, when receiving the result of the determination indicating that the possibility of contact is high from the contact determiner 116 and the result of the determination indicating that the location of the contact is on the guidance route from the route determiner 118, the control processor 117A may transmit the position information on the location of the contact to the navigator 150.

The control processor 117A may cause the navigator 150 to display a message indicating that the guidance route has been changed to avoid the location of the contact.

For example, the control processor 117A may send the navigator 150 information indicating "As a possible location where the bottom portion of the vehicle will come into contact with the road surface is detected on the guidance route, the guidance is started along another route that avoids the location".

The control processor 117A may cause the navigator 150 to display the position of the location of the contact to avoid.

The navigator 150 may calculate the guidance route from a current position to a destination, display the calculated guidance route, and perform the route guidance.

In the second example embodiment, the navigator 150 nay transmit the information on the guidance route to the route determiner 118.

In the second example embodiment, when receiving the position information on the location of the contact from the control processor 117A, the navigator 150 may calculate the guidance route to the destination that avoids the location of the contact, and may display the calculated guidance route to perform the route guidance.

In the second example embodiment, the navigator 150 may display the information received from the control processor 117A.

Process in Vehicle 100A Upon Reception of Contact Information

Now, an exemplary process in the vehicles 100A upon the reception of the contact information from the server apparatus 300 is described with reference to FIG. 10.

As illustrated in FIG. 10, the contact determiner 116 may determine whether the possibility of contact between the bottom portion of the corresponding vehicle 100A and the road surface is high based on the vehicle information included in the contact information received from the server apparatus 300 and the vehicle information on the corresponding vehicle 100A stored in the memory 120 (Step S410).

When the contact determiner 116 determines that the possibility of contact between the bottom portion of the corresponding vehicle 100A and the road surface is not high (Step S410: NO), the process may be terminated.

In contrast, when the contact determiner 116 determines that the possibility of contact between the bottom portion of the corresponding vehicle 100A and the road surface is high (Step S410: YES), the process may proceed to Step S420.

The route determiner 118 may determine whether the location where the possibility of contact is determined to be high is on the guidance route calculated by the navigator 150 (Step S420).

When the route determiner 118 determines that no location where the possibility of contact is determined to be high is on the guidance route calculated by the navigator 150 (Step S420: NO), the process may be terminated.

In contrast, when the route determiner 118 determines that the location where the possibility of contact is determined to be high is on the guidance route calculated by the navigator 150 (Step S420: YES), the process may proceed to Step S430.

The control processor 117A may send the navigator 150 an instruction to calculate another guidance route to the destination that avoids the location of the contact (Step S430).

The navigator 150 may start the guidance along the calculated guidance route (Step S440), following which the process may be terminated.

Workings and Effects

As described above, the road surface contact avoidance system 1A according to the second example embodiment includes the server apparatus 300 and the vehicles 100A communicably coupled to the server apparatus 300 via the network 200.

Each of the vehicles 100A may include the navigator 150 and the route determiner 118. The navigator 150 may calculate a guidance route from a current position to a destination, display the calculated guidance route, and perform the route guidance. The route determiner 118 may determine whether the location of the contact is on the guidance route calculated by the navigator 150.

When the contact determiner 116 determines that the possibility of contact is high and the route determiner 118 determines that the location of the contact is on the guidance route calculated by the navigator 150, the control processor

117A may perform the control adapted to cause the navigator 150 to calculate another guidance route to the destination that avoids the location of the contact.

That is, when detecting that the location where the possibility of contact between the bottom portion of the vehicle 100A and the road surface is determined to be high is on the guidance route, the vehicle 100A may perform the guidance to the destination along the guidance route that avoids the location of the contact.

This makes it possible to urge the occupant to drive the vehicle 100A on the guidance route to the destination that avoids the location of the contact. It is therefore possible to avoid the occurrence of contact between the bottom portion of the vehicle 100A and the road surface.

Modification Example 1

When detecting the location where the possibility of contact between the bottom portion of the vehicle 100 and the road surface is high, the vehicle 100 of the road surface contact avoidance system 1 according to the example embodiment described above may notify the occupant of the location of the contact by causing the display 140 to display the information urging the occupant to drive the vehicle 100 so as to avoid the location of the contact; however, the notification may be additionally made by means of sounds and voices.

This makes it possible to issue a more effective notification to the occupant. It is therefore possible to avoid the occurrence of contact between the bottom portion of the vehicle 100 and the road surface.

Modification Example 2

The road surface contact detector 113 of the vehicle 100 in the road surface contact avoidance system 1 according to the example embodiment described above may detect the contact between the bottom portion of the corresponding vehicle 100 and the road surface; however, the road surface contact detector 113 may further detect a location of contact with the road surface.

For example, when undercovers such as a radiator undercover 510, an engine undercover 520, a left-side center floor cover 530, and a right-side center floor cover 540 are installed on the bottom surface of the vehicle 100 as illustrated in FIG. 11, the road surface contact detector 113 may detect the contact between the bottom portion of the vehicle 100 and the road surface and may determine which undercover has come into contact with the road surface based on a sensor output from an impact sensor disposed on each of the undercovers.

Thereafter, the contact information generator 114 may generate the contact information additionally including data on the lowest ground level and the installation position of the undercover in contact with the road surface, for example.

This enables more detailed contact information to be shared between the vehicles. It is therefore possible to determine the possibility of contact between the bottom portion of the vehicle 100 and the road surface more accurately.

Modification Example 3

According to the road surface contact avoidance system 1 according to the example embodiment described above, the server apparatus 300 may transmit the contact information to be shared between the vehicles 100 to the vehicles 100;

however, the vehicles 100 may actively acquire the contact information from the server apparatus 300.

For example, the contact determiner 116 may acquire the contact information detected within the predetermined range from the current position of the corresponding vehicle 100 from the storage 320 of the server apparatus 300.

Thereafter, the contact determiner 116 may determine whether the possibility of contact between the bottom portion of the corresponding vehicle 100 and the road surface is high based on the contact information acquired from the storage 320 and the vehicle information on the corresponding vehicle 100.

This reduces the processing load on the server apparatus 300.

In some example embodiments, it is possible to implement the vehicle 100 of the example embodiment of the disclosure by recording the processes to be executed by the contact determiner 116, the control processor 117, and the like on a non-transitory recording medium readable by a computer system, and causing the computer system to load the program recorded on the non-transitory recording medium onto the contact determiner 116, the control processor 117, and the like to execute the program.

The computer system as used herein may encompass an operating system (OS) and a hardware such as a peripheral device.

When the computer system utilizes a World Wide Web (WWW) system, the "computer system" may encompass a website providing environment (or a website displaying environment).

The program may be transmitted from a computer system that contains the program in a storage or the like to another computer system via a transmission medium or by a carrier wave in a transmission medium.

The "transmission medium" that transmits the program may refer to a medium having a capability to transmit data, including a network (e.g., a communication network) such as the Internet and a communication link (e.g., a communication line) such as a telephone line.

Further, the program may be directed to implement a part of the operation described above.

The program may be a so-called differential file (differential program) configured to implement the operation by a combination of a program already recorded on the computer system.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

Each of the position information obtainer 111, the road surface contact detector 113, the contact information generator 114, the contact information transmitter 115, the contact determiner 116, the control processors 117 and 117A, and the information transmitter 330 illustrated in FIGS. 2, 4, and 9 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the position information obtainer 111, the road surface contact detector 113, the contact information generator 114, the contact information transmitter 115, the contact determiner 116, the control processors 117 and 117A, and the information transmitter 330. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the position information obtainer 111, the road surface contact detector 113, the contact information generator 114, the contact information transmitter 115, the contact determiner 116, the control processors 117 and 117A, and the information transmitter 330 illustrated in FIGS. 2, 4, and 9.

The invention claimed is:

1. A road surface contact avoidance system comprising:
a server apparatus; and
vehicles communicably coupled to the server apparatus via a network, wherein
each of the vehicles comprises:
   a position information obtainer configured to acquire first position information indicating a first position of a corresponding vehicle of the vehicles;
   a road surface contact detector configured to detect contact between a bottom portion of the corresponding vehicle and a road surface;
   a contact information generator configured to generate first contact information including (i) the first position information indicating the first position of the corresponding vehicle at a time of the contact and (ii) first vehicle information indicating one or both of (a) a first length that is an overall length of the corresponding vehicle and (b) a first height that is a lowest ground level of the corresponding vehicle;
   a communicator configured to:
      transmit the first contact information to the server apparatus; and
      receive, from the server apparatus, second contact information including (i) second position information indicating a second position of another vehicle of the vehicles and (ii) second vehicle information indicating one or both of a second length and a second height of the another vehicle;
   a display;
   a contact determiner configured to determine, based on the first vehicle information and the second vehicle information, whether there is a possibility of contact between the bottom portion of the corresponding vehicle and the road surface at the second position; and
   a control processor configured, in response to determining that there is the possibility of contact between the bottom portion of the corresponding vehicle and the road surface at the second position, to;
      perform control adapted to avoid an occurrence of the contact between the bottom portion of the corresponding vehicle and the road surface at the second position;

generate a control signal to cause the display to display information corresponding to the second position; and output the generated control signal to the display, and the server apparatus comprises:

a storage configured to store the first contact information received from the communicator of each of the vehicles; and an information transmitter configured to transmit the first contact information stored in the storage to the vehicles.

2. The road surface contact avoidance system according to claim 1, wherein the vehicles comprise a first vehicle and a second vehicle, the communicator of each of the vehicles is configured to transmit current position information indicating a current position of the corresponding vehicle to the server apparatus, and the information transmitter is configured to send, to the first vehicle, the first contact information on the second vehicle detected within a predetermined range from the current position information received from the first vehicle out of the first contact information stored in the storage.

3. The road surface contact avoidance system according to claim 2, wherein the control processor is configured to, in response to determining that there is a possibility of contact between the bottom portion of the corresponding vehicle and the road surface at the second position, notify an occupant of the corresponding vehicle of the second position.

4. The road surface contact avoidance system according to claim 2, wherein the vehicles each comprise;

a navigator configured to calculate a guidance route from a current position to a destination, display the guidance route, and perform route guidance along the guidance route, and a route determiner configured to determine whether the second position is on the guidance route calculated by the navigator; and the control processor is configured to send the navigator an instruction to calculate another guidance route to the destination that avoids the second position when: the contact determiner determines that there is a possibility of contact between the bottom portion of the corresponding vehicle and the road surface at the second position; and the route determiner determines that the second position is on the guidance route calculated by the navigator.

5. A road surface contact avoidance system comprising:

a server apparatus; and vehicles communicably coupled to the server apparatus via a network, wherein each of the vehicles comprises:

a display;

one or more processors; and one or more memories communicably coupled to the one or more processors, the one or more processors are configured to:

acquire first position information indicating a first position of a corresponding vehicle of the vehicles;

detect contact between a bottom portion of the corresponding vehicle and a road surface;

generate first contact information including (i) the first position information indicating the first position of the corresponding vehicle at a time of the contact and (ii) first vehicle information indicating one or both of (a) a first length that is an overall length of the corresponding vehicle and (b) a first height that is a lowest ground level of the corresponding vehicle;

transmit the first contact information to the server apparatus;

receive, from the server apparatus, second contact information including (i) second position information indicating a second position of another vehicle of the vehicles and (ii) second vehicle information indicating one or both of a second length and a second height of the another vehicle;

determine, based on the first vehicle information and the second vehicle information, whether there is a possibility of contact between the bottom portion of the corresponding vehicle and the road surface at the second position;

in response to determining that there is the possibility of contact between the bottom portion of the corresponding vehicle and the road surface at the second position, (i) perform control adapted to avoid an occurrence of the contact between the bottom portion of the corresponding vehicle and the road surface at the second position, (ii) generate a control signal to cause the display to display information corresponding to the second position; and (iii) output the generated control signal to the display, and the server apparatus comprises:

a storage configured to store the first contact information received from the one or more processors of each of the vehicles; and a processor configured to transmit the first contact information stored in the storage to the vehicles.

6. A vehicle comprising:

a communicator configured to communicate with a server apparatus;

an impact sensor disposed in a bottom portion of the vehicle;

a GPS receiver;

a display; and a first circuitry configured to:

store first vehicle information indicating one or both of (i) a first length that is an overall length of the vehicle and (ii) a first height that is a lowest ground level of the vehicle;

determine, based on a signal received from the impact sensor, whether an output of the impact sensor is greater than a predetermined threshold value;

generate, based on a signal received from the GPS receiver, first position information indicating a first position of the vehicle at a time when a value of the output of the impact sensor is determined to be greater than the predetermined threshold value;

in response to generating of the first position information, transmit first contact information to the server apparatus via the communicator, the first contact information including the first position information and the first vehicle information;

periodically generate current position information indicating a latest position of the vehicle based on the signal received from the GPS receiver;

in response to generating of the current position information, transmit the current position information to the server apparatus via the communicator;

receive second contact information from the server apparatus via the communicator, the second contact information including (i) second position information indicating a second position and (ii) second vehicle information indicating one or both of a second length and a second height;

in response to receiving of the second contact information, determine, based on the first vehicle information and the second vehicle information, whether there is a possibility of contact between the bottom portion of the vehicle and a road surface at the second position;

in response to determining that there is the possibility of contact between the bottom portion of the vehicle and the road surface at the second position, perform control adapted to avoid an occurrence of the contact between the bottom portion of the vehicle and the road surface at the second position, and generate a control signal to cause the display to display information corresponding to the second position; and output the generated control signal to the display.

7. The vehicle according to claim 6, wherein the first vehicle information indicates the first length, wherein the second vehicle information indicates the second length, and wherein the first circuitry is further configured to:

in response to the second contact information, determine whether the first length is greater than the second length; and in response to determining that the first length is greater than the second length, determine that there is the possibility of contact between the bottom portion of the vehicle and the road surface at the second position.

8. The vehicle according to claim 7, wherein the information corresponding to the second position includes information for notifying an occupant of the vehicle of the second position.

9. The vehicle according to claim 7, wherein the information corresponding to the second position includes information indicating a route from the latest position indicated by the current position information to a predetermined destination without passing through the second position.

10. The vehicle according to claim 6, wherein the first vehicle information indicates the first height, wherein the second vehicle information indicates the second height, and wherein the first circuitry is further configured to:

in response to receiving the second contact information, determine whether the first height is less than the second height; and in response to determining that the first height is less than the second height, determine that there is the possibility of contact between the bottom portion of the vehicle and the road surface at the second position.

11. The vehicle according to claim 10, wherein the information corresponding to the second position includes information for notifying an occupant of the vehicle of the second position.

12. The vehicle according to claim 10, wherein the information corresponding to the second position includes information indicating a route from the latest position indicated by the current position information to a predetermined destination without passing through the second position.

13. The vehicle according to claim 6, wherein the information corresponding to the second position includes information for notifying an occupant of the vehicle of the second position.

14. The vehicle according to claim 6, wherein the information corresponding to the second position includes information indicating a route from the latest position indicated by the current position information to a predetermined destination without passing through the second position.

15. A server apparatus comprising:

a second communicator configured to communicate with the vehicle according to claim 6; and a second circuitry configured to:

receive the first contact information from the vehicle via the second communicator;

store the received first contact information;

receive the current position information from the vehicle via the second communicator; and in response to receiving the current position information from the vehicle, transmit, as the second contact information, the stored first contact information including first position information indicating a first position within a predetermined distance from a position indicated by the received current position information.

* * * * *